March 3, 1964 — R. F. LEIS — 3,123,283
ANTI-ICING VALVE MEANS
Filed Dec. 7, 1962
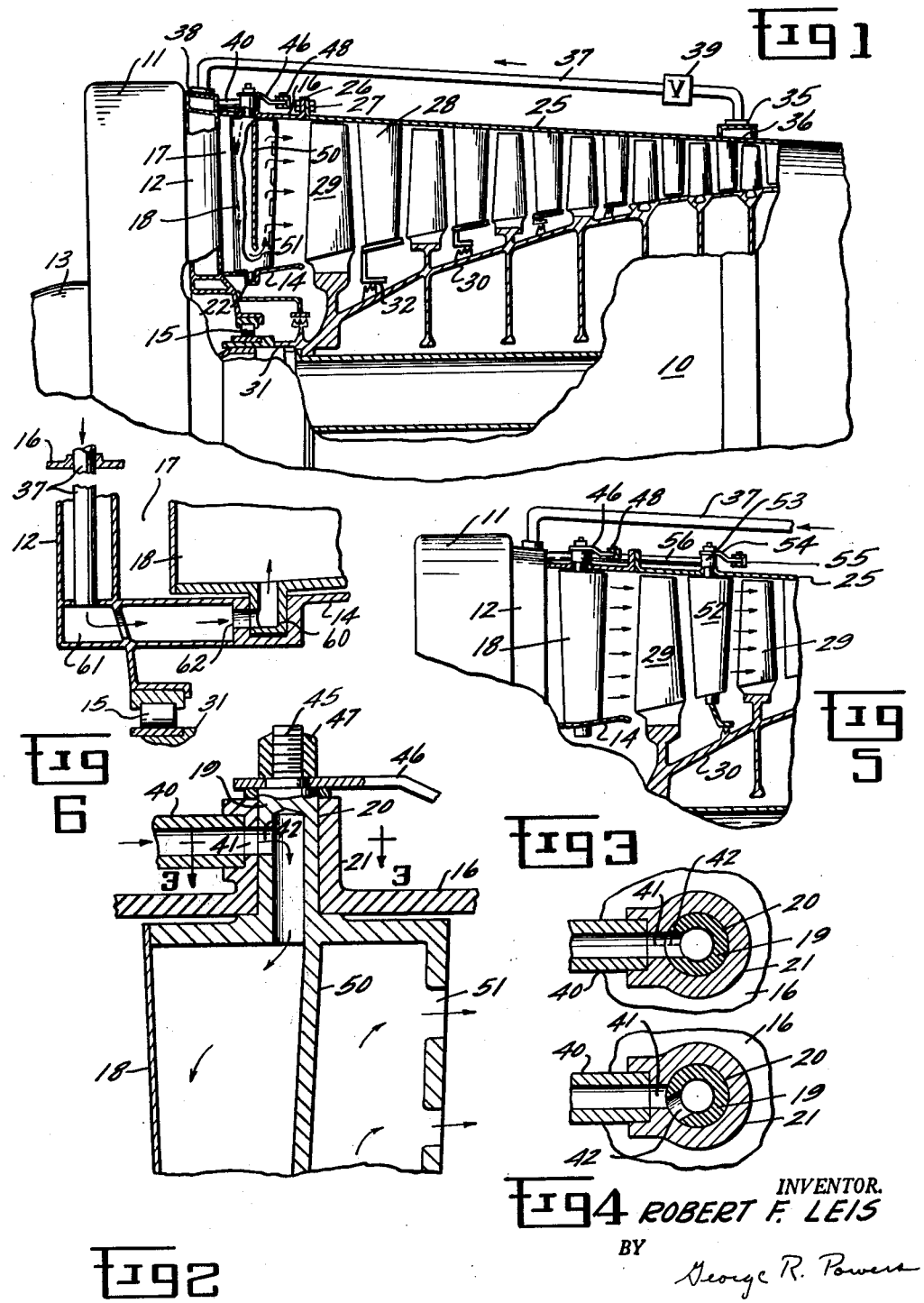
INVENTOR.
ROBERT F. LEIS
BY George R. Powers
ATTORNEY—

United States Patent Office 3,123,283
Patented Mar. 3, 1964

3,123,283
ANTI-ICING VALVE MEANS
Robert Francis Leis, Wakefield, Mass., assignor to General Electric Company, a corporation of New York
Filed Dec. 7, 1962, Ser. No. 243,153
10 Claims. (Cl. 230—114)

This invention relates to systems for preventing ice accumulation in the inlet passages of gas turbine engines and, more particularly, to improved valve means for controlling the flow of high temperature fluid through such anti-icing systems.

A plurality of inlet guide vanes are conventionally provided in the inlet passage of a gas turbine engine to direct the entering air to the compressor rotor at the proper angle. With high performance gas turbine engines having compressors designed to operate at high compression ratios when the compressor is rotating at high speed, provisions are commonly made for varying the angles of the inlet guide vanes. In such high performance engines, the angle of the vanes is set so that they present the least restriction to air flow when the compressor is rotating at high speed and has a high compression ratio capability. This permits the maximum amount of air to enter the engine, thus producing a high compression ratio and high thrust with good engine efficiency. If the inlet guide vanes are allowed to remain wide open when the compressor is rotating at lower speed, however, the air flow will be too great and the compression ratio capability of the compressor at the lower speed will be exceeded. To prevent stall resulting from operation at an excessive compression ratio, the inlet guide vanes are closed at lower compressor speeds to reduce both the amount of air flow through the engine and the compression ratio.

When a gas turbine engine is used to propel an aircraft, adverse atmospheric conditions encountered during flight may cause ice to form and accumulate in the inlet passage and on the inlet guide vanes. If any appreciable quantity of ice is allowed to accumulate, the compressor inlet cross-sectional area is reduced and, consequently, the amount of air flow through the engine is reduced below that called for by the angular setting of the guide vanes. The reduced air flow results in decreased thrust or power output of the engine. At the maximum power setting of the engine where the inlet guide vanes are wide open, the lost power cannot be recovered as it often can at lower engine speeds by opening the guide vanes still further to permit additional air flow. In addition to the loss of engine power, the reduced air flow may cause engine failure due to severe over-temperature conditions in the combustor, turbine, and exhaust sections of the engine. For these reasons, it is generally desirable to provide means for preventing the formation and accumulation of ice in the inlet passage and on the inlet guide vanes.

Ice formation and accumulation may be prevented by extracting high temperature compressed air from the compressor discharge section or from one of the intermediate compressor stages and directing the extracted air through the variable angle inlet guide vanes. After it is passed through the interiors of the guide vanes, the air which is still at a relatively high temperature is conventionally disposed of in one of two ways, the first of these being to direct the hot air to the outside of the engine nacelle, or the fuselage in the case of a fuselage mounted engine, where it is discharged into the atmosphere. Known as "dumping overboard," this first way of disposing of the hot air results in a slight loss of engine power. For example, extraction of one percent of compressor airflow at all engine speeds may thus result in approximately a one percent loss in engine power throughout the operating range of the engine. While the amount of the power loss may be entirely satisfactory, dumping overboard is often considered undesirable because of the complex and expensive duct arrangements which must be provided in both the engine and the aircraft to supply the air to atmosphere. In view of fire hazards in the engine bay, it is not sufficient to merely direct the hot air to the exterior of the engine.

The second way to dispose of the high temperature air after it has passed through the interiors of the variable inlet guide vanes is to discharge, or "dump," it back into the compressor air stream. This second way is much simpler than dumping overboard since the complex and expensive duct arrangements necessary for dumping overboard are eliminated. Dumping overboard has one advantage over dumping into the compressor air stream, however, in that the power loss accompanying a given percentage of extraction is much greater when dumping into the compressor air stream. For example, extraction of one percent of the airflow as discussed with respect to dumping overboard may result in as much as a four or five percent loss in engine power when the high temperature air is returned to the air stream. This excessive power loss is undesirable and often prohibitive at the maximum power setting of the engine where the lost power cannot be recovered by going to still higher power settings. The high temperature air dumped into the air stream warms the entering air, thereby decreasing its density and reducing the total air flow through the engine at any given position of the inlet guide vanes. It also appears that the hot air causes increased clearances throughout the compressor, thereby increasing leakage and inefficiency.

It has been found however that the amount of anti-icing air required as a percentage of the total compressor air flow at high engine speeds is much less than that required at low speeds. It is therefore possible to dump the high temperature air back into the compressor air stream and still have an acceptably low power loss at the high power settings by reducing the percentage of air extracted at high engine speeds. Attempts have been made in the past to control the percentage of extraction by means of elaborate valve arrangements which sense the engine operating conditions and schedule the air flow accordingly. These complex valve arrangements have proved to be expensive and because of their complexity often unreliable. Even when the valve arrangement itself is not extremely unreliable, it still represents an additional element in the system which may fail and cause undesirable consequences.

It is therefore a primary object of this invention to provide an improved system for preventing ice accumulation in the inlet passage of a gas turbine engine.

It is another object of this invention to provide an improved anti-icing system which does not cause an excessive loss of engine power at maximum engine speed.

A further object of this invention is to provide an anti-icing system for a gas turbine engine which is inexpensive and simple to manufacture and operate.

A still further object of this invention is to provide an anti-icing system which is extremely reliable in operation.

Briefly stated, in accordance with an illustrated embodiment of the invention, a plurality of hollow inlet guide vanes are provided in the inlet passage of the compressor of a gas turbine engine. Each guide vane is provided with a hollow spindle on one of its ends which is rotatably mounted in a bore in the compressor the interior of each of the spindles communicating with the interior of its associated hollow vane. Ports are provided in the wall of each spindle and in the wall of the associated bore, the ports being aligned to define a maximum area opening when the inlet guide vanes are in their closed low power position and being misaligned to define a minimum area opening when the inlet guide vanes are in their open high power position. High temperature fluid, preferably compressed air from the compressor discharge section or an intermediate stage, is supplied to the openings defined by the ports, the amount of fluid flowing through the openings and the spindles to the guide vanes being determined by the area of the openings or, in other words, by the angular position of the inlet guide vanes.

While the specification concludes with claims particularly pointing out and distinctly claiming the subject matter regarded as the invention, it is believed that the invention, together with further objects and advantages, may best be understood by reference to the following description taken in connection with the accompanying drawing, in which:

FIGURE 1 is a view partly in cross-section of a compressor including an inlet guide vane anti-icing system which utilizes this invention;

FIGURE 2 is a detail view of a portion of the inlet guide vane structure shown in FIGURE 1;

FIGURE 3 is a view taken along line 3—3 of FIGURE 2;

FIGURE 4 is a view similar to FIGURE 3 showing the spindle of the inlet guide vane in a moved position;

FIGURE 5 is a view similar to FIGURE 1 illustrating the utilization of the invention on an anti-icing system for both variable inlet guide vanes and variable stator vanes; and FIGURE 6 is a view similar to FIGURE 1 showing a modification of the invention.

Referring first to FIGURE 1, a conventional type of axial flow compressor indicated generally by the numeral 10 is illustrated. The compressor 10 includes a cylindrical front frame 11 having several support struts 12 extending radially inward from the frame 11 to support a forward fairing 13, an inner cylindrical wall 14, and a bearing 15. The front frame 11 also includes a rearwardly extending cylindrical casing 16 which forms with the inner cylindrical wall 14 an annular compressor inlet passage 17. A plurality of angularly adjustable inlet guide vanes 18 are mounted between the casing 16 and the wall 14, each guide vane 18 having a radial spindle 19 at its outer end rotatably received in a radial bore 20 extending through a boss 21 in the casing 16 as shown in FIGURE 2. Each guide vane 18 also has a radial spindle 22 rotatably received in the inner cylindrical wall 14. The operation of the guide vanes will be discussed in detail at a later point in this description.

A cylindrical casing 25 surrounding the remainder of the compressor 10 is secured to the front frame casing 16 at the circumferential flanges 26 carried by the casings by means of bolts 27 or similar fastening devices spaced uniformly around the periphery of the flanges. The casing 25 supports a plurality of rows of stationary stator vanes 28. A plurality of rows of rotor blades 29 alternate with the rows of stator vanes 28. The rotor blades 29 are secured to a drum 30 which terminates in a shaft 31 at its forward end, the shaft being rotatably mounted in the bearing 15. The clearance between the tips of the rotor blades 29 and the casing 25 is held as small as practicable in order to prevent undesired leakage around the tips of the blades. Shroud rings 32 are supported from the inner tips of each row of stator vanes 28 to prevent undesired leakage around the inner tips of the stator vanes 28.

An annular manifold 35 is formed about the periphery of the casing 25 at one of the intermediate compressor stages, the manifold 35 being shown in FIGURE 1 located just forward of the seventh row of rotor blades 29. As this description proceeds, it will become obvious to those skilled in the art that the manifold 35 can alternatively be located about other stages or about the compressor discharge section. A plurality of openings 36 are provided in the casing 25 through which high temperature compressed air is bled into the manifold 35. A pipe 37 connects the annular manifold 35 to an annular manifold 38 formed integrally with the front frame 11. An On-Off valve 39 is located in the pipe 37 to selectively permit full flow or prevent air flow through the pipe 37, the valve 39 conventionally being operated by a solenoid (not shown) controlled manually by the pilot of the aircraft. The On-Off valve 39 can alternately be controlled automatically, the means for controlling the On-Off valve 39 forming no part of this invention.

A plurality of tubes 40 connect the annular manifold 38 to the bosses 21 in the front frame casing 16, there being one tube 40 leading to each boss 21 as shown in FIGURES 2–4. A passage 41 aligned with the interior passage of the tube 40 is located in the boss 21 and terminates in a port in the wall of the bore 20. A similar passage or port 42 is located in the wall of the guide vane spindle 19. The ports in the bore 20 and the spindle 19 are aligned to form a maximum area opening when the spindle 19 is in one angular position as shown in FIGURE 3 and misaligned to form a minimum area opening when the spindle 19 is in a second angular position as shown in FIGURE 4.

Referring back to FIGURES 1 and 2, the operation of the inlet guide vanes 18 will now be described in detail. The radially extending spindle 19 at the outer end of each of the guide vanes 18 extends outwardly beyond the boss 21 and terminates in a reduced diameter threaded portion 45. An actuating arm 46 is connected to the spindle 19 and held in place by a nut 47 screwed onto the threaded portion 45 of the spindle 19. The angular position of the spindle 19 and its associated guide vane 18 can be varied by moving the actuating arm 46. As shown in FIGURE 1, the end of the actuating arm 46 is pivotally attached to a circumferentially extending actuating ring 48 so that the guide vane 18 and the spindle 19 are rotated as the actuating ring 48 is moved circumferentially around the casing 16 by actuating means (not shown). In practice, the actuating ring 48 may be moved between two extreme positions, the first extreme position resulting in a wide open inlet guide vane setting for maximum engine power where the maximum amount of air is allowed to flow through the compressor. At the other extreme actuating ring setting, the low power setting, the inlet guide vanes 18 are closed to permit minimum flow of air through the compressor 10.

It will be remembered at this point that a lower amount of anti-icing air is required, as a percentage of total air flow, at high power settings than at low power settings. Therefore, in accordance with this invention, the passages 42 are located on the spindle 19 so that they are aligned with the ports in the bosses 21, or the passages 41, for maximum anti-icing flow when the inlet guide vanes 18 are in their closed low power position. It will thus be obvious that FIGURE 3 illustrates the alignment of the passages 41 and 42 at the low power engine setting. At higher power settings, a lower amount of anti-icing air, as a percentage of total air flow, is required. In accordance with the invention, the passages 41 and 42 are misaligned to the maximum extent when the guide vanes 18 are wide open for maximum engine power. FIGURE 4 illustrates the alignment of the passages 41 and 42 at the maximum power setting. It will be noted at this point that passages 41 and 42 are illustrated as having the same area and configuration. With both passages having the same area and configuration, the change in flow area defined by passages 41 and 42 is gradual and uniform as the guide vanes 18 are moved between their extreme positions. Consequently, the percentage of anti-icing air flow is also uniformly changed. In practice, however, it may be desirable to maintain a constant flow of anti-icing air, as a percentage of total air flow, over a broad range of engine power settings, the percentage of anti-icing air flow being reduced substantially at higher power settings. One way to accomplish this (not shown) is to make the passage 42 oversize so that the flow area begins to change only after the spindle 19 is moved a substantial amount from the low power position illustrated by FIGURE 3.

To this point, the means for supplying high temperature compressed air to the inlet guide vanes 18 has been described in detail. The means for directing the high temperature air through the inlet guide vanes and for discharging the air into the compressor air stream will now be described. As shown in FIGURES 1 and 2, a radially extending partition 50 is located in the hollow interior of the guide vane 18. The air entering the interior of the guide vane 18 from the hollow spindle 19 is first directed inwardly along the leading edge of the guide vane 18 until it reaches the inner end of the radial partition 50 (not shown). After reaching the inner end of the partition 50, the air can turn and flow outwardly along the trailing edge of the inlet guide vane from which it escapes into the compressor air stream through a plurality of discharge passages 51 in the wall of the guide vane 18. It will, of course, be obvious to those skilled in the art that alternate means may be utilized for directing the air through the guide vanes and for discharging the air into the compressor air stream. For example, a single discharge passage may be used if desired instead of the plurality of discharge passages 51.

Referring now to FIGURE 5, the invention is shown applied to a row of inlet guide vanes 18 and, in addition, to a row of adjustable stator vanes 52. Like elements are given the same identification numerals as in the embodiment illustrated by FIGURES 1-4. The row of adjustable stator vanes 52 are provided with radially extending spindles 53 rotatably mounted in the casing 25. An actuating arm 54 is secured to each spindle 53 in the previously described manner, and the actuating arm 54 is pivotally attached to an actuating ring 55 adapted for circumferential movement around the casing 25 by an actuating means (not shown). If desired, the actuating rings 48 and 55 may be connected for movement in unison. The adjustable stator vanes 52 are supplied with hot compressed air through tubes 56 connected to the annular manifold 38 like tubes 40. The valving arrangement for supplying the air to the stator vanes 52 and the interior directing means are substantially identical to those described with respect to the inlet guide vane 18.

Turning now to FIGURE 6, the anti-icing air may alternatively be supplied to the guide vanes 18 through spindles 60 at the radially inner tips of the vanes 18. As shown by FIGURE 6, the pipe 37 is directed radially inwardly through the casing 16 to an annular manifold 61 adjacent inner spindles 60. A plurality of tubes 62 connect the manifold 61 to the spindles 60, the anti-icing air thereby being supplied to the vanes 18 in a manner substantially identical to that described in detail above.

It will be obvious to those skilled in the art that the invention as described results in a valving arrangement for controlling the amount of anti-icing flow, as a percentage of total compressor air flow, which is extremely simple and which does not require additional elements which may increase the possibility of engine failure. The valve arrangement described cannot fail unless there is an independent failure in the inlet guide vane actuating system. Any failure which may occur in the actuating system would, of course, also occur on prior art compressors not utilizing the present invention.

Therefore, while a preferred embodiment of the invention has been described, it will be obvious to those skilled in the art that various changes and modifications may be made without departing from the invention, and it is therefore intended to cover in the appended claims all such changes and modificatons as fall within the true spirit and scope of the invention.

What we claim as new and desire to secure by Letters Patent of the United States is:

1. In a compressor for a gas turbine engine, a vane assembly comprising,
 a compressor casing,
 a plurality of hollow vanes extending radially inward from said casing,
 a hollow spindle on an end of each of said vanes,
 the interior of each of said spindles communicating with the interior of the respective vane,
 a plurality of radially extending cylindrical passages in said compressor each receiving one of said spindles for rotation therein,
 each of said vanes and its associated spindle being rotatable between a first position and a second position,
 a first port in the wall of each of said radially extending passages,
 means supplying high temperature fluid to each of said first ports,
 a second port in the wall of each of said spindles communicating with interior of said spindle,
 each pair of first and second ports aligned to form a maximum area opening when said vanes are in said first position and misaligned to form a minimum area opening when said vanes are in said second position,
 whereby the high temperature fluid is directed to the interior of each of said vanes through different area openings when said vanes are in said first position and in said second position.

2. In a compressor for a gas turbine engine, a vane assembly comprising,
 a compressor casing,
 a plurality of hollow vanes extending radially inward from said casing,
 a hollow spindle on an end of each of said vanes,
 the interior of each of said spindles communicating with the interior of the respective vane,
 a plurality of radially extending cylindrical passages in said compressor each receiving one of said spindles for rotation therein,
 each of said vanes and its associated spindle being rotatable through a range of angles,
 said range of angles being bounded at its ends by a first angular position and a second angular position of said guide vane and its associated spindle,
 a first port in the wall of each of said radially extending passages,
 means supplying high temperature fluid to each of said first ports,
 a second port in the wall of each of said spindles communicating with interior of said spindle,
 each pair of first and second ports aligned when said vanes are in said first angular position and misaligned when said guide vanes are rotated out of said first position, the maximum misalignment occurring when said guide vanes are in said second angular position,
 whereby the high temperature fluid is directed to the interior of each of said guide vanes through a variable area opening determined by the angular position of said guide vanes, the maximum area occurring when said guide vanes are in said first angular position and the minimum area occurring when said guide vanes are in said second angular position.

3. In a compressor for a gas turbine engine, a vane assembly comprising,
 a compressor casing,
 a plurality of hollow vanes extending radially inward from said casing,
 a hollow spindle on the outer end of each of said guide vanes,
 the interior of each of said spindles communicating with the interior of the respective vane,
 a plurality of radially extending cylindrical passages in said casing each receiving one of said spindles for rotation therein,
 actuating means for rotating each of said guide vanes and its associated spindle through a range of angles,
 said range of angles being bounded at its ends by a first angular position and a second angular position of said guide vane and its associated spindle, a first port in the wall of each of said radially extending passages, an annular manifold surrounding said compressor casing, means supplying high temperature fluid to said annular manifold, passages connecting said annular manifold to said first ports for directing said high temperature fluid thereto, a second port in the wall of each of said spindles communicating with interior of said spindle, each pair of first and second ports aligned when said vanes are in said first angular position and misaligned when said guide vanes are rotated out of said first position, the maximum misalignment occurring when said guide vanes are in said second angular position, whereby the high temperature fluid is directed to the interior of each of said guide vanes through a variable area opening determined by the angular position of said guide vanes, the maximum area occurring when said guide vanes are in said first angular position and the minimum area occurring when said guide vanes are in said second angular position.

4. A vane assembly as defined in claim 3 in which said first and second ports have the same area and configuration.

5. In a compressor for a gas turbine engine, an inlet guide vane assembly comprising, a compressor casing, an inner cylindrical wall coaxially mounted within said casing to form therewith an annular compressor inlet passage, a plurality of hollow inlet guide vanes extending radially across said annular inlet passage, a hollow spindle on an end of each of said vanes, the interior of each of said spindles communicating with the interior of the respective vane, a plurality of radially extending cylindrical passages in said compressor each receiving one of said spindles for rotation therein, actuating means for rotating each of said guide vanes and its associated spindle through a range of angles, said range of angles being bounded at its ends by a first angular position and a second angular position of said guide vane and its associated spindle, a first port in the wall of each of said radially extending passages, means supplying high temperature fluid to each of said first ports, a second port in the wall of each of said spindles communicating with interior of said spindle, each pair of first and second ports aligned when said vanes are in said first angular position and misaligned when said guide vanes are rotated out of said first position, the maximum misalignment occurring when said guide vanes are in said second angular position, whereby the high temperature fluid is directed to the interior of each of said guide vanes through a variable area opening determined by the angular position of said guide vanes, the maximum area occurring when said guide vanes are in said first angular position and the minimum area occurring when said guide vanes are in said second angular position.

6. In a compressor for a gas turbine engine, an inlet guide vane assembly comprising, a compressor casing, an inner cylindrical wall coaxially mounted within said casing to form therewith an annular compressor inlet passage, a plurality of hollow inlet guide vanes extending radially across said annular inlet passage, a hollow spindle on the outer end of each of said guide vanes, the interior of each of said spindles communicating with the interior of the respective vane, a plurality of radially extending cylindrical passages in said casing each receiving one of said spindles for rotation therein, actuating means for rotating each of said guide vanes and its associated spindle through a range of angles, said range of angles being bounded at its ends by a first angular position and a second angular position of said guide vane and its associated spindle, a first port in the wall of each of said radially extending passages, an annular manifold surrounding said compressor casing, means supplying high temperature fluid to said annular manifold, passages connecting said annular manifold to said first ports for directing said high temperature fluid thereto, a second port in the wall of each of said spindles communicating with interior of said spindle, each pair of first and second ports aligned when said vanes are in said first angular position and misaligned when said guide vanes are rotated out of said first position, the maximum misalignment occurring when said guide vanes are in said second angular position, whereby the high temperature fluid is directed to the interior of each of said guide vanes through a variable area opening determined by the angular position of said guide vanes, the maximum area occurring when said guide vanes are in said first angular position and the minimum area occurring when said guide vanes are in said second angular position.

7. A vane assembly as defined in claim 6 in which said first and second ports have the same area and configuration.

8. In a gas turbine engine, a multi-stage compressor comprising, a compressor casing, an inner cylindrical wall coaxially mounted within said casing to form therewith an annular compressor inlet passage, a plurality of hollow inlet guide vanes extending radially across said annular inlet passage, a hollow spindle on the outer end of each of said guide vanes, the interior of each of said spindles communicating with the interior of the respective vane, a plurality of radially extending cylindrical passages in said casing each receiving one of said spindles for rotation therein, actuating means for rotating each of said guide vanes and its associates spindle through a range of angles, said range of angles being bounded at its ends by a first angular position and a second angular position of said guide vane and its associated spindle, a plurality of axially spaced rows of stator vanes extending radially inward from said casing downstream of said inlet passage, a rotor mounted within said casing for rotation therein having a plurality of axially spaced rows of rotors blades alternating with said rows of stator vanes, a first port in the wall of each of said radially extending passages, means for supplying a portion of the air compressed by said compressor to each of said first ports, a second port in the wall of each of said spindles communicating with interior of said spindle, each pair of first and second ports aligned when said vanes are in said first angular position and misaligned when said guide vanes are rotated out of said first position, the maximum misalignment occurring when said guide vanes are in said second angular position, whereby the high temperature fluid is directed to the interior of each of said guide vanes through a variable area opening determined by the angular position of said guide vanes, the maximum area occurring when said guide vanes are in said first angular position and the minimum area occurring when said guide vanes are in said second angular position.

9. In a gas turbine engine, a multi-stage compressor comprising, a compressor casing, an inner cylindrical wall coaxially mounted within said casing to form therewith an annular compressor inlet passage, a plurality of hollow inlet guide vanes extending radially across said annular inlet passage, a hollow spindle on the outer end of each of said guide vanes, the interior of each of said spindles communicating with the interior of the respective vane, a plurality of radially extending cylindrical passages in said casing each receiving one of said spindles for rotation therein, actuating means for rotating each of said guide vanes and its associated spindle through a range of angles, said range of angles bounded at one end by a first angular position of said guide vane providing minimum air flow through said inlet passage and at its other end by a second angular position of said guide vane providing maximum air flow through said inlet passage, a plurality of axially spaced rows of stator vanes extending radially inward from said casing downstream of said inlet passage, a rotor mounted within said casing for rotation therein having a plurality of axially spaced rows of rotor blades alternating with said rows of stator vanes, a first port in the wall of each of said radially extending passages, at least one extraction opening in said casing for extracting a portion of the air compressed by said compressor, an annular manifold surrounding said compressor casing, conduit means connecting said extraction opening to said annular manifold for supplying the extracted air thereto, valve means in said conduit means movable only between a fully open position permitting maximum flow of the extracted air and a fully closed position permitting no flow of the extracted air through said conduit means, passages connecting said annular manifold to said first ports for directing the extracted air thereto when said valve means is in said fully open position, each pair of first and second ports aligned when said vanes are in said first angular position and misaligned when said guide vanes are rotated out of said first position, the maximum misalignment occurring when said guide vanes are in said second angular position, whereby the high temperature fluid is directed to the interior of each of said guide vanes through a variable area opening determined by the angular position of said guide vanes, the maximum area occurring when said guide vanes are in said first angular position and the minimum area occurring when said guide vanes are in said second angular position.

10. A compressor assembly as defined in claim 9 in which said first and second ports have the same area and configuration.

No references cited.